United States Patent
Ito et al.

(10) Patent No.: US 11,786,981 B2
(45) Date of Patent: Oct. 17, 2023

(54) CUTTING INSERT, CUTTING EDGE-REPLACEABLE ROTARY CUTTING TOOL AND ROTARY CUTTING METHOD

(71) Applicant: SUBARU CORPORATION, Tokyo (JP)

(72) Inventors: Kinue Ito, Tokyo (JP); Kenji Murai, Tokyo (JP); Kiichi Yamazaki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 100 days.

(21) Appl. No.: 17/109,988

(22) Filed: Dec. 2, 2020

(65) Prior Publication Data

US 2021/0178498 A1  Jun. 17, 2021

(30) Foreign Application Priority Data

Dec. 16, 2019 (JP) .................................. 2019-226362

(51) Int. Cl.
*B23C 5/20* (2006.01)
*B23C 5/10* (2006.01)
(Continued)

(52) U.S. Cl.
CPC .............. *B23C 5/202* (2013.01); *B23C 5/109* (2013.01); *B23C 5/06* (2013.01); *B23C 5/2213* (2013.01);
(Continued)

(58) Field of Classification Search
CPC .......... B23C 2200/28; B23C 2200/281; B23C 2200/208; B23C 2200/283;
(Continued)

(56) References Cited

U.S. PATENT DOCUMENTS 5,145,295 A * 9/1992 Satran ................... B23C 5/2213
D15/139
5,190,418 A * 3/1993 Nakayama .............. B23C 5/202
407/42
(Continued)

FOREIGN PATENT DOCUMENTS

EP  0489702 A2  6/1992
EP  0506098 A1  9/1992
(Continued)

OTHER PUBLICATIONS

JP-2002046002-A Machine Translation (Year: 2022).*
(Continued)

*Primary Examiner* — Nicole N Ramos
(74) *Attorney, Agent, or Firm* — McDermott Will & Emery LLP

(57) ABSTRACT

A cutting insert has a plate shape centered on an insert center axis. The cutting insert includes a front surface and a back surface facing an insert axial direction, an outer peripheral surface facing outward in an insert radial direction, and a cutting edge at an intersecting ridge line between the front surface and the outer peripheral surface. The back surface has a flat shape perpendicular to the insert center axis. The outer peripheral surface includes a flank surface coupled. The flank surface is inclined inward in the insert radial direction as extending in the insert axial direction from the front surface side to the back surface side. The front surface includes a rake surface. The rake surface is inclined from a back surface side to a front surface side in the insert axial direction as extending inward in the insert radial direction from the cutting edge.

6 Claims, 11 Drawing Sheets

(51) Int. Cl.
   *B23C 5/06* (2006.01)
   *B23C 5/22* (2006.01)
(52) U.S. Cl.
   CPC .. *B23C 2200/123* (2013.01); *B23C 2200/125* (2013.01); *B23C 2200/203* (2013.01); *B23C 2200/205* (2013.01); *B23C 2222/04* (2013.01)
(58) Field of Classification Search
   CPC ........ B23C 2200/284; B23C 2200/287; B23C 2200/08; B23C 2200/12; B23C 2200/243; B23C 5/20; B23C 5/202
   See application file for complete search history.

(56) References Cited

U.S. PATENT DOCUMENTS

| | | | | |
|---|---|---|---|---|
| 5,207,538 | A * | 5/1993 | Satran | B23C 5/2213 D15/139 |
| 5,593,255 | A * | 1/1997 | Satran | B23C 5/2213 407/116 |
| 6,196,770 | B1 * | 3/2001 | Astrom | B23C 5/109 407/43 |
| 6,669,412 | B1 * | 12/2003 | Hirose | B23C 5/2213 407/116 |
| 2003/0170079 | A1 | 9/2003 | Daiguji et al. | |
| 2008/0304924 | A1 * | 12/2008 | Engstrom | B23C 5/2213 407/35 |
| 2009/0311057 | A1 * | 12/2009 | Yoshida | B23C 5/2247 407/113 |
| 2014/0334890 | A1 | 11/2014 | Takahashi | |
| 2019/0210124 | A1 * | 7/2019 | Slusarcyk | B23C 5/2213 |
| 2020/0254529 | A1 | 8/2020 | Kiuchi et al. | |

FOREIGN PATENT DOCUMENTS

| | | |
|---|---|---|
| EP | 3378589 A1 | 9/2018 |
| FR | 2789613 A1 | 8/2000 |
| JP | 62208817 A * | 9/1987 |
| JP | 01-155111 U | 10/1989 |
| JP | 08-323510 A | 12/1996 |
| JP | 10-146712 A | 6/1998 |
| JP | 2002046002 A * | 2/2002 |
| JP | 2003-001512 A | 1/2003 |
| JP | 2003-334716 A | 11/2003 |
| JP | 2006-181702 A | 7/2006 |
| WO | 2013/088851 A1 | 6/2013 |
| WO | 2017/085975 A1 | 5/2017 |

OTHER PUBLICATIONS

JP-62208817-A Machine Translation (Year: 2022).*
Extended European Search Report issued in corresponding European Patent Application No. 20214106-1017, dated May 20, 2021.
International Search Report issued in co-pending U.S. Appl. No. 17/734,652 corresponding International Patent Application No. PCT/JP2020/40545, dated Dec. 22, 2020, with English translation.
Japanese Notice of Reasons for Refusal issued in Japanese Patent Application No. 2019-226036, dated Apr. 5, 2023, with English translation.
Japanese Notice of Reasons for Refusal issued in Japanese Patent Application No. 2019-226362, dated Aug. 15, 2023, with English translation.

* cited by examiner

CUTTING INSERT, CUTTING EDGE-REPLACEABLE ROTARY CUTTING TOOL AND ROTARY CUTTING METHOD

CROSS-REFERENCE TO RELATED APPLICATIONS

The present application claims priority from Japanese Patent Application No. 2019-226362 filed on Dec. 16, 2019, the entire contents of which are hereby incorporated by reference.

BACKGROUND

The disclosure relates to a cutting insert, a cutting edge-replaceable rotary cutting tool, and a rotary cutting method.

In related art, for example, a cutting edge-replaceable rotary cutting tool for performing rotary cutting on an aluminum alloy workpiece is known such as a cutting edge-replaceable end mill or a cutting edge-replaceable milling cutter.

A cutting edge-replaceable rotary cutting tool disclosed in Japanese Unexamined Patent Application Publication (JP-A) No. 2003-334716 includes a tool holder rotatable around a holder center axis, and a polygonal plate-shaped cutting insert detachably attached to a front end of the tool holder. The cutting insert includes a front surface, a back surface, an outer peripheral surface coupling the front surface and the back surface, and a cutting edge formed on an intersecting ridge line between the front surface and the outer peripheral surface. The front surface includes a rake surface coupled to the cutting edge, and the outer peripheral surface includes a flank surface coupled to the cutting edge.

In the cutting insert disclosed in the JP-A-2003-334716, the rake surface and the flank surface are inclined surfaces having positive angles.

SUMMARY

An aspect of the disclosure provides a cutting insert having a plate shape centered on an insert center axis. The cutting insert includes a front surface and a back surface, an outer peripheral surface, and a cutting edge. The front surface and a back surface face an insert axial direction that is a direction in which the insert center axis extends. The outer peripheral surface faces outward in an insert radial direction orthogonal to the insert center axis. The cutting edge is formed at an intersecting ridge line between the front surface and the outer peripheral surface. The back surface has a flat shape perpendicular to the insert center axis. The outer peripheral surface includes a flank surface coupled to the cutting edge. The flank surface extends while is inclined inward in the insert radial direction as the flank surface extends in the insert axial direction from a front surface side to a back surface side. The front surface includes a rake surface coupled to the cutting edge. The rake surface extends while being inclined from the back surface side to the front surface side in the insert axial direction as the rake surface extends inward in the insert radial direction from the cutting edge.

An aspect of the disclosure provides a cutting edge-replaceable rotary cutting tool. The includes a tool holder and a cutting insert. The tool holder is centered on a holder center axis. The cutting insert has a plate shape. The cutting insert is disposed at a front end of the tool holder in a holder axial direction that is a direction in which the holder center axis extends. The tool holder includes, at the front end of the tool holder, an insert mounting seat on which the cutting insert is detachably mounted. The insert mounting seat includes a mounting surface facing a holder rotation direction among a holder circumferential direction around the holder center axis. The cutting insert includes a front surface facing the holder rotation direction, a back surface facing a direction reversed to the holder rotation direction among the holder circumferential direction, an outer peripheral surface coupled to the front surface and the back surface, and a cutting edge formed at an intersecting ridge line between the front surface and the outer peripheral surface. The cutting edge projects forward in the holder axial direction from the front end of the tool holder. The front surface has a rake surface coupled to the cutting edge. The rake surface extends while being inclined in the holder rotation direction as the rake surface extends rearward in the holder axial direction from the cutting edge. The back surface is in contact with the mounting surface. The mounting surface extends while being inclined in the direction reversed to the holder rotation direction among the holder circumferential direction as the mounting surface extends rearward in the holder axial direction.

An aspect of the disclosure provides a rotary cutting method for performing rotary cutting on a workpiece using the cutting edge-replaceable rotary cutting tool of the second aspect. The rotary cutting method includes causing the front end of the tool holder to face the workpiece from the holder axial direction, rotating the tool holder in the holder rotation direction, and performing the rotary cutting on the workpiece with the cutting edge.

DETAILED DESCRIPTION

In related art, when performing rotary cutting on a plate-shaped part, having a plate thickness of about several millimeters, of a workpiece such as a long wing surface member of an aircraft that extends for several meters, the workpiece may bend after the rotary cutting. When the workpiece bends and warps, it takes time and effort to perform various measures to correct the warpage.

In view of the above circumstances, it is desirable to provide a cutting insert, a cutting edge-replaceable rotary cutting tool, and a rotary cutting method that can prevent generation of warpage on a workpiece.

A cutting insert 1, a cutting edge-replaceable rotary cutting tool 10, and a rotary cutting method of an embodiment of the disclosure will be described with reference to the accompanying drawings.

The cutting edge-replaceable rotary cutting tool 10 of the present embodiment is, for example, a cutting edge-replaceable end mill, a cutting edge-replaceable milling cutter, or the like. The cutting edge-replaceable rotary cutting tool 10 is used to perform the rotary cutting such as face milling on a workpiece such as an aluminum alloy wing surface member for use in, for example, an aircraft. In one example, the workpiece is a long member of several meters (for example, 3 meters or more), and has a plate-shaped part having a plate thickness of several millimeters (for example, about 2 mm). The workpiece has multiple pocket portions. The plate-shaped part having the plate thickness of several millimeters is located, for example, on a bottom wall of the pocket portion. The cutting edge-replaceable rotary cutting tool 10 is particularly suitable for performing the rotary cutting such as finishing on a plate-shaped part of a workpiece. The cutting edge-replaceable rotary cutting tool 10 has a cutting edge having an outer diameter of, for example, approximate 25 mm, and is suitable for performing the rotary cutting on a pocket portion of a workpiece.

Figure 1:
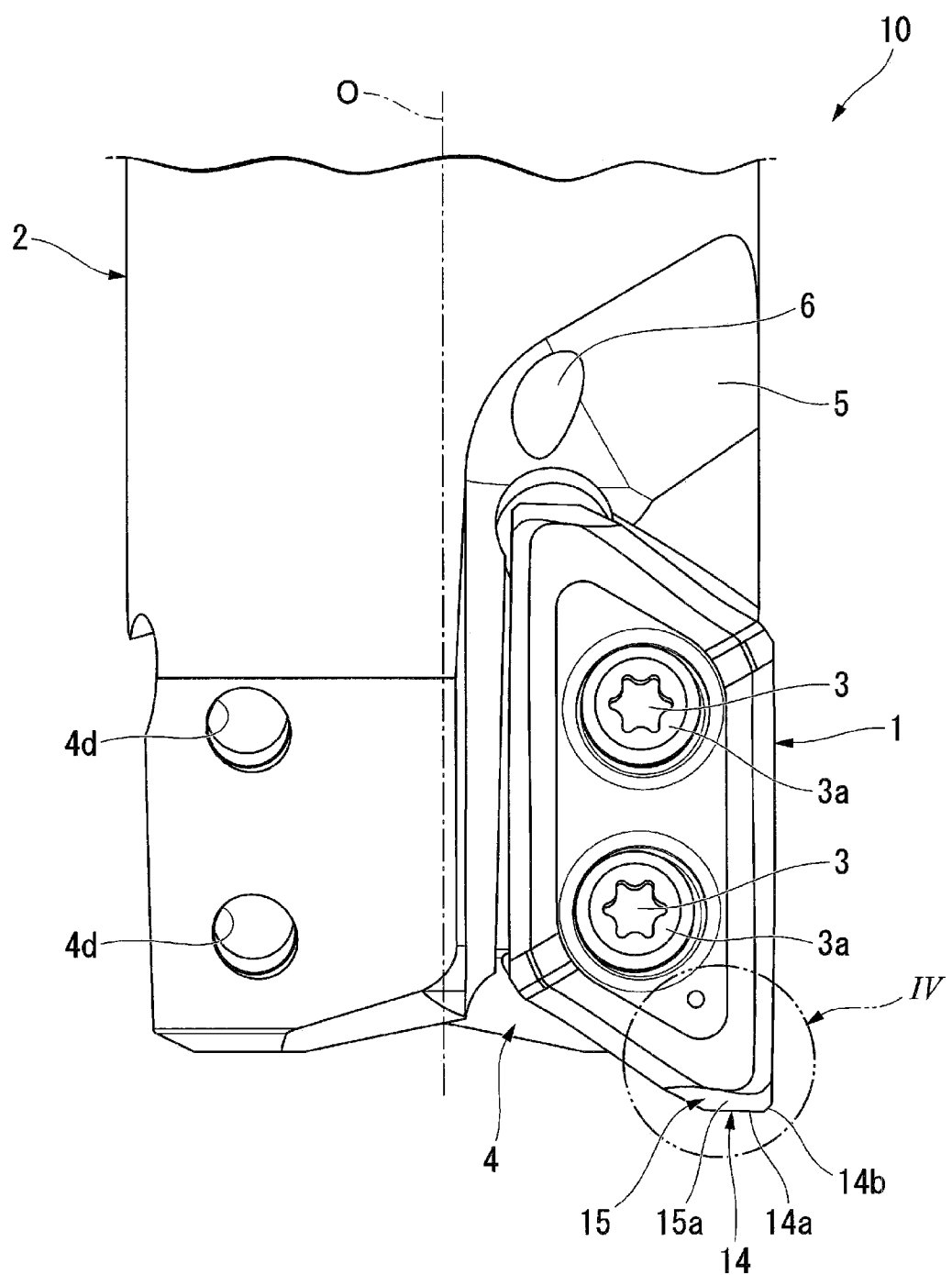
FIG. 1 is a plan view illustrating a part of a cutting edge-replaceable rotary cutting tool according to an embodiment of the disclosure, in which a front surface of a cutting insert is viewed in the front from a holder circumferential direction.
Figure 2:
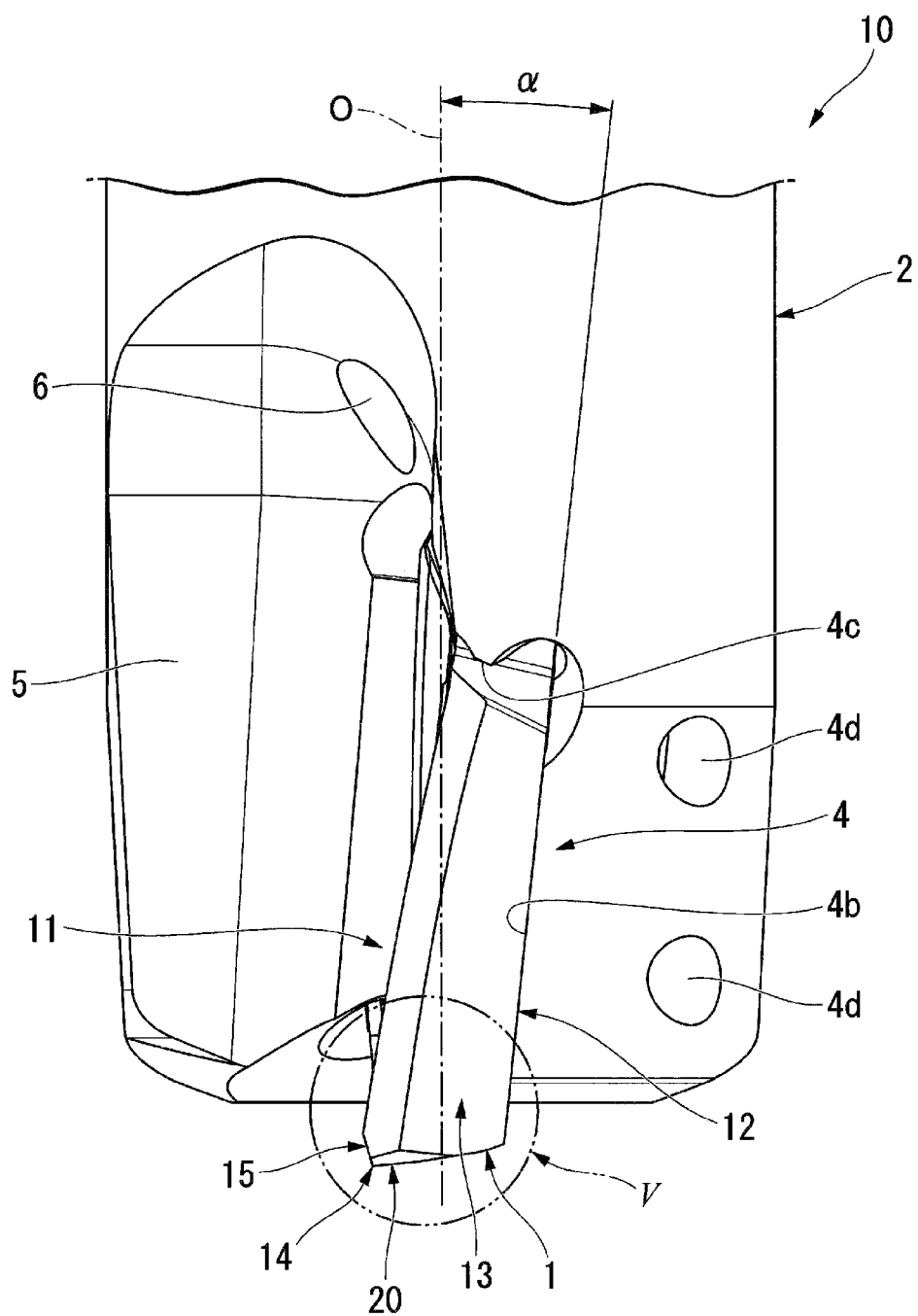
FIG. 2 is a side view illustrating a part of the cutting edge-replaceable rotary cutting tool as viewed from a cutting edge length direction of a main cutting edge portion of the cutting insert.
Figure 3:
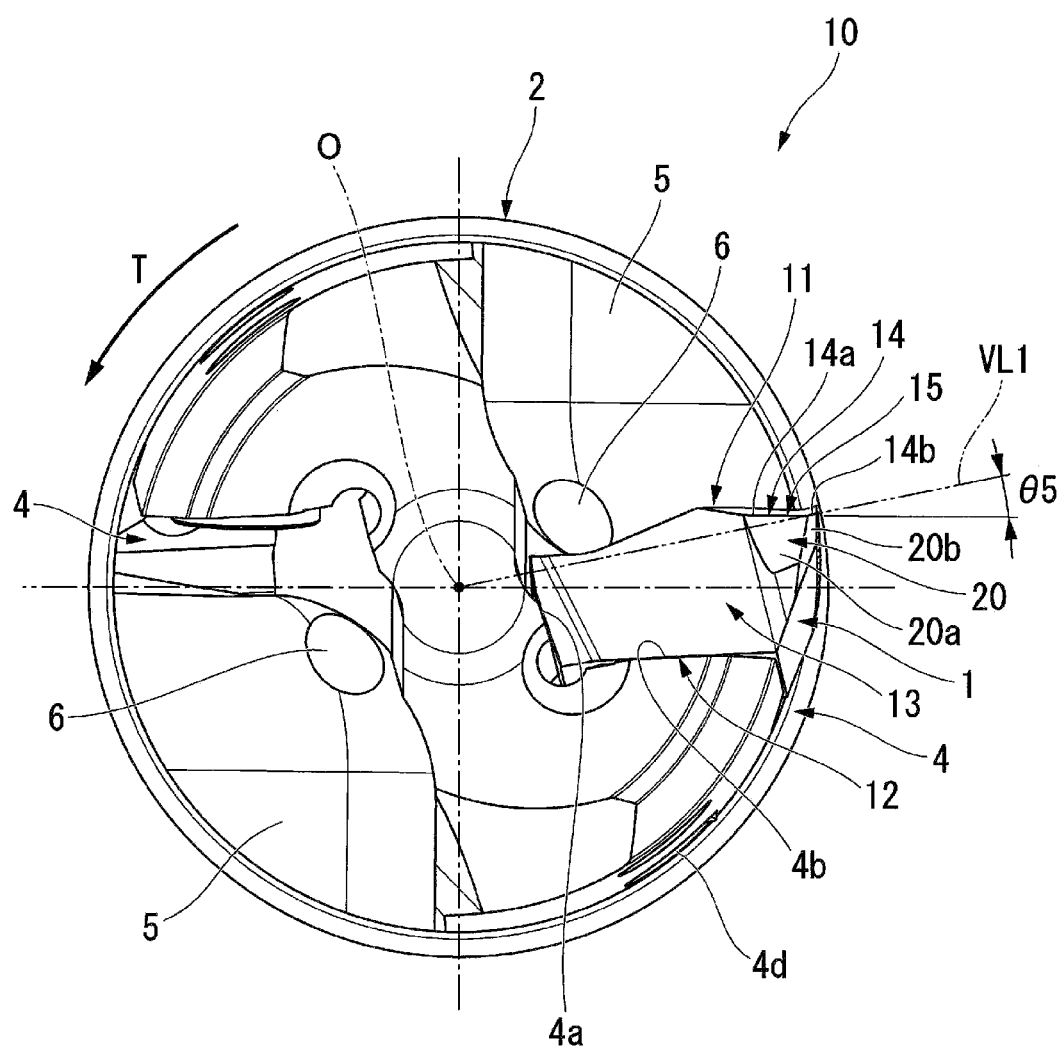
FIG. 3 is a bottom view illustrating the cutting edge-replaceable rotary cutting tool as viewed from a holder axial direction.

As illustrated in FIGS. 1 to 3, the cutting edge-replaceable rotary cutting tool 10 includes a tool holder 2, the cutting insert 1, and a screw member 3.

The tool holder 2 has a columnar shape or the like centered on a holder center axis O. The tool holder 2 is detachably mounted on a main shaft of a machine tool (not illustrated). The tool holder 2 is rotated around the holder center axis O by the main shaft of the machine tool. Two ends of the tool holder 2 in a holder axial direction which is a direction in which the holder center axis O extends includes a first end and a second end. The main shaft of the machine tool is coupled to the first end of the tool holder 2. The cutting insert 1 is disposed at the second end of the tool holder 2. The first end of the tool holder 2 may be referred to as a "shank portion", and the second end may be referred to as a "cutting edge portion".

In the present embodiment, multiple cutting inserts 1 are provided in the cutting edge-replaceable rotary cutting tool 10. The cutting inserts 1 are attached to the tool holder 2. It is noted that in FIGS. 1 to 3, some of the multiple cutting inserts 1 are not illustrated.

As illustrated in FIGS. 6 to 9, the cutting insert 1 has a plate shape centered on an insert center axis C. In the present embodiment, the cutting insert 1 has a polygonal plate shape. The cutting insert 1 includes a front surface 11 and a back surface 12 that face an insert axial direction that is a direction in which the insert center axis C extends, an outer peripheral surface 13 that couples the front surface 11 and the back surface 12, and a cutting edge 14 formed on an intersecting ridge line between the front surface 11 and the outer peripheral surface 13.

As illustrated in FIG. 1, the cutting insert 1 is fixed to the tool holder 2 by the screw members 3. Multiple screw members 3 are provided on the cutting edge-replaceable rotary cutting tool 10.

Definition of Directions

In the present embodiment, the direction in which the holder center axis O of the tool holder 2 extends (that is, a direction extending along the holder center axis O) is referred to as the "holder axial direction". In the holder axial direction, a direction from the first end (that is, the shank portion) of the tool holder 2 to the second end (that is, the cutting edge portion) of the tool holder 2 is referred to as "forward", and a direction from the second end to the first end is referred to as "rearward".

A direction orthogonal to the holder center axis O is referred to as a "holder radial direction". In the holder radial direction, a direction approaching the holder center axis O is referred to as "inward in the holder radial direction", and a direction away from the holder center axis O is referred to as "outward in the holder radial direction".

A direction rotating around the holder center axis O is referred to as a "holder circumferential direction". In the holder circumferential direction, a direction in which the tool holder 2 is rotated during the rotary cutting is referred to as a "holder rotation direction T", and a rotation direction reverse to this direction is referred to as a "direction reversed to the holder rotation direction T" (or a "reversed holder rotation direction").

The direction in which the insert center axis C of the cutting insert 1 extends (that is, the direction extending along the insert center axis C) is referred to as the "insert axial direction". The insert axial direction may be referred to as a "thickness direction of the cutting insert 1". In the insert axial direction, a direction extending from the front surface 11 to the back surface 12 of the cutting insert 1 may also be referred to as "from the front surface 11 side to the back surface 12 side", and a direction extending from the back surface 12 to the front surface 11 may also referred to as "from the back surface 12 side to the front surface 11 side".

A direction orthogonal to the insert center axis C is referred to as an "insert radial direction". In the insert radial direction, a direction approaching the insert center axis C is referred to as "inward in the insert radial direction", and a direction away from the insert center axis C is referred to as "outward in the insert radial direction".

A direction rotating around the insert center axis C is referred to as an "insert circumferential direction".

In the present embodiment, a direction in which a main cutting edge portion 14a (which will be described later) of the cutting edge 14 extends is referred to as a "cutting edge length direction".

Tool Holder

The tool holder 2 is made of a metal such as a steel material. The tool holder 2 has a columnar shape or a tubular shape. As illustrated in FIGS. 1 to 3, the tool holder 2 of the present embodiment has a columnar shape or a cylindrical shape. The tool holder 2 may have a disk shape or the like. The tool holder 2 includes an insert mounting seat 4, a chip pocket 5, and a coolant hole 6.

Insert Mounting Seat

The insert mounting seat 4 is disposed at a front end of the tool holder 2. The insert mounting seat 4 is recessed rearward in the holder axial direction from a front end surface of the tool holder 2. The insert mounting seat 4 is recessed inward in the holder radial direction from an outer peripheral surface of the tool holder 2. The insert mounting seat 4 has a hole shape to which the cutting insert 1 can be mounted. The insert mounting seat 4 has a polygonal hole shape. In the present embodiment, the insert mounting seat 4 has a quadrangular hole shape. Multiple insert mounting seats 4 are provided in the tool holder 2. The multiple insert mounting seats 4 are disposed on an outer periphery of the front end of the tool holder 2 at intervals in the holder circumferential direction.

The cutting insert 1 is detachably mounted on the insert mounting seat 4. The cutting insert 1 is mounted on the insert mounting seat 4 such that the cutting edge 14 (including a main cutting edge portion 14a and a corner cutting edge portion 14b, which will be described later) projects forward in the holder axial direction from the front end surface of the tool holder 2. The cutting insert 1 is mounted on the insert mounting seat 4 such that a part of the cutting edge 14 (that is, an outward end of the main cutting edge portion 14a and the corner cutting edge portion 14b, which will be described later) projects outward in the holder radial direction from the outer peripheral surface of the tool holder 2.

The insert mounting seat 4 includes an inner wall surface 4a, a mounting surface 4b, an upper wall surface 4c, and a screw hole 4d.

In the insert mounting seat 4, the inner wall surface 4a faces outward in the holder radial direction. The inner wall surface 4a has a flat shape. The inner wall surface 4a has, for example, a quadrangular shape. As illustrated in FIG. 3, the inner wall surface 4a extends inward in the holder radial direction as the inner wall surface 4a extends toward the holder rotation direction T. When the cutting insert 1 is mounted on the insert mounting seat 4, the inner wall surface 4a comes into contact with the outer peripheral surface 13. In one example, the inner wall surface 4a comes into contact with a part, facing inward in the holder radial direction, of the outer peripheral surface 13.

In the insert mounting seat 4, the mounting surface 4b faces the holder rotation direction T. The mounting surface 4b has a flat shape. The mounting surface 4b has a polygonal shape, for example, a quadrangular shape. As illustrated in FIG. 2, the mounting surface 4b extends while being inclined in the direction reversed to the holder rotation direction T as the mounting surface 4b extends rearward in the holder axial direction. That is, the mounting surface 4b is a positive inclined surface having a positive axial rake angle. In one example, as illustrated in FIG. 2, when viewed from the cutting edge length direction of the cutting edge 14 (for example, the main cutting edge portion 14a which will be described later), an angle $\alpha$ between the holder center axis O and the mounting surface 4b is a positive angle. The angle $\alpha$ is, for example, greater than 0° and equal to or less than 10°. The angle $\alpha$ is smaller than a first angle $\theta 1$ (which will be described later) of the cutting insert 1. When the cutting insert 1 is mounted on the insert mounting seat 4, the mounting surface 4b comes into contact with the back surface 12.

In the insert mounting seat 4, the upper wall surface 4c faces forward in the holder axial direction. The upper wall surface 4c has a flat shape. The upper wall surface 4c has, for example, a quadrangular shape. As illustrated in FIG. 2, the upper wall surface 4c extends rearward in the holder axial direction as the upper wall surface 4c extends toward the holder rotation direction T. When the cutting insert 1 is mounted on the insert mounting seat 4, the upper wall surface 4c comes into contact with the outer peripheral surface 13. In one example, the upper wall surface 4c comes into contact with a part, facing rearward in the holder axial direction, of the outer peripheral surface 13.

The screw hole 4d opens in the mounting surface 4b. The screw hole 4d extends substantially perpendicular to the mounting surface 4b. In the present embodiment, the screw hole 4d also opens on the outer peripheral surface of the tool holder 2. That is, the screw hole 4d is a through hole. Although not particularly illustrated, the screw hole 4d has a female screw on an inner peripheral surface of the screw hole 4d. In the present embodiment, multiple screw holes 4d are provided in the insert mounting seat 4. The multiple screw holes 4d are disposed at intervals in the holder axial direction.

Chip Pocket

As illustrated in FIGS. 1 to 3, the chip pocket 5 is disposed on the outer periphery of the front end of the tool holder 2. Multiple chip pockets 5 are provided in the tool holder 2. The multiple chip pockets 5 are disposed at intervals in the holder circumferential direction. Each chip pocket 5 is adjacent to a respective one of the insert mounting seats 4 in the holder rotation direction T. Each chip pocket 5 is coupled to the respective one of the insert mounting seats 4 from the holder rotation direction T.

The chip pocket 5 is recessed rearward in the holder axial direction from the front end surface of the tool holder 2. A length (depth) at which the chip pocket 5 is recessed rearward in the holder axial direction from the front end surface of the tool holder 2 is larger than a length at which the insert mounting seat 4 is recessed rearward in the holder axial direction from the front end surface of the tool holder 2.

The chip pocket 5 is recessed inward in the holder radial direction from the outer peripheral surface of the tool holder 2s. A length (depth) at which the chip pocket 5 is recessed inward in the holder radial direction from the outer peripheral surface of the tool holder 2 is larger than a length at which the insert mounting seat 4 is recessed inward in the holder radial direction from the outer peripheral surface of the tool holder 2.

Coolant Hole

The coolant hole 6 extends inside the tool holder 2. In the present embodiment, the coolant hole 6 extends in the tool holder 2 in the holder axial direction. The coolant hole 6 passes through the tool holder 2. Although not particularly illustrated, a rearward end of the coolant hole 6 in the holder axial direction is coupled to a coolant supplying unit such as a pump through a flow channel, a pipe, and the like inside the main shaft of the machine tool. Coolant such as cutting fluid or compressed air is supplied from the coolant supplying unit to the coolant hole 6. A forward end of the coolant hole 6 in the holder axial direction opens to the chip pocket 5. The coolant hole 6 opens toward the cutting edge 14 of the cutting insert 1 mounted on the insert mounting seat 4 and a part to be processed of the workpiece.

Cutting Insert

The cutting insert 1 is made of a cemented carbide containing, for example, tungsten carbide and cobalt as components. As illustrated in FIGS. 6 to 9, the cutting insert 1 has a plate shape, for example, a polygonal plate shape. In the present embodiment, the cutting insert 1 has a quadrangular plate shape. A pair of plate surfaces (that is, the front surface 11 and the back surface 12) of the cutting insert 1 face the insert axial direction.

The cutting insert 1 of the present embodiment has a 180° rotationally symmetric shape about the insert center axis C. The cutting insert 1 does not have a front-back rotationally symmetric shape. That is, the cutting insert 1 has a front-back rotationally asymmetric shape. The cutting insert 1 is a single-sided cutting tip.

As illustrated in FIGS. 1 to 3, the cutting insert 1 is disposed at the front end of the tool holder 2. When the cutting insert 1 is attached to the tool holder 2, the front surface 11 and the back surface 12 of the cutting insert 1 face the holder circumferential direction. That is, the cutting insert 1 of the present embodiment is of a so-called horizontal edge type. When the cutting insert 1 is mounted on the insert mounting seat 4, although not particularly illustrated, the insert center axis C of the cutting insert 1 extends while being inclined rearward in the holder axial direction as the insert center axis C of the cutting insert 1 extends toward the holder rotation direction T.

The cutting insert 1 includes the cutting edge 14, the front surface 11, the back surface 12, the outer peripheral surface 13, and through holes 19. The back surface 12 has a flat shape perpendicular to the insert center axis C. The back surface 12 may be referred to as a "reference surface of the cutting insert 1".

Cutting Edge

When the cutting insert 1 is attached to the tool holder 2, the cutting edge 14 of the cutting insert 1 projects forward in the holder axial direction from the front end of the tool holder 2. As illustrated in FIGS. 6 to 9, multiple cutting edges 14 are provided on the cutting insert 1 in the present embodiment. In the illustrated example, two cutting edges 14 are provided on the cutting insert 1. The multiple cutting edges 14 are disposed at intervals in the insert circumferential direction. In the present embodiment, when viewed from the insert axial direction as illustrated in FIG. 7, the cutting edge 14 extends along a part of a short side among four sides (that is, a pair of long sides and a pair of short sides) constituting an outer peripheral edge of the front surface 11.

The cutting edge 14 includes the main cutting edge portion 14a and the corner cutting edge portion 14b.

Figure 9:
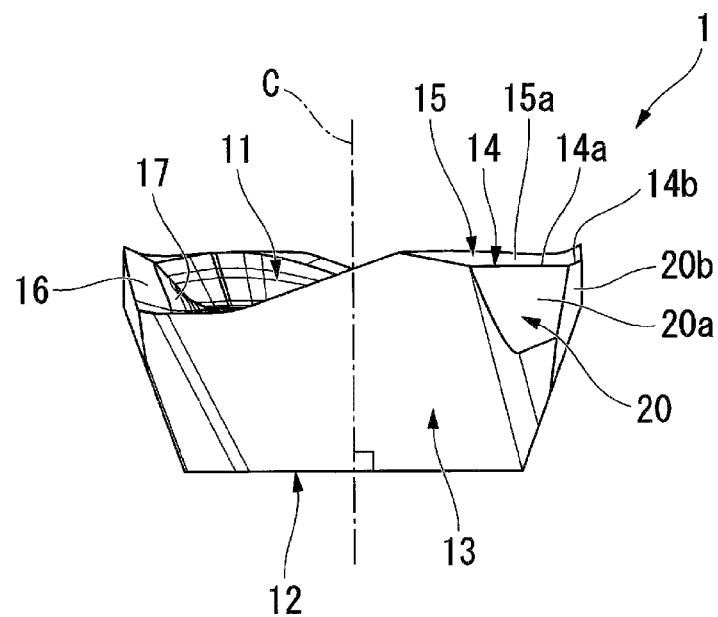
FIG. 9 is a bottom view (top view) illustrating the cutting insert as viewed from a direction orthogonal to the main cutting edge portion, in an insert radial direction.

In the present embodiment, the main cutting edge portion 14a has a linear shape. In the present embodiment, the main cutting edge portion 14a serves as a wipe insert that finishes a surface to be processed of the workpiece. As illustrated in FIG. 9, when viewed from the insert radial direction, the main cutting edge portion 14a extends substantially perpendicular to the insert center axis C. In FIG. 9, the main cutting edge portion 14a extends substantially parallel to the back surface 12.

As illustrated in FIG. 3, when viewed from the holder axial direction, in a state in which the cutting insert 1 is attached to the tool holder 2, the main cutting edge portion 14a extends in the direction reversed to the holder rotation direction T as the main cutting edge portion 14a extends outward in the holder radial direction. When viewed from the holder axial direction, a fifth angle θ5 between the main cutting edge portion 14a and a virtual straight line VL1 passing through the outward end of the main cutting edge portion 14a in the holder radial direction and the holder center axis O is 12° or more and 30° or less. The fifth angle θ5 may be referred to as a "radial rake angle of the main cutting edge portion 14a". In the present embodiment, the radial rake angle of the main cutting edge portion 14a is a negative angle.

Figure 4:
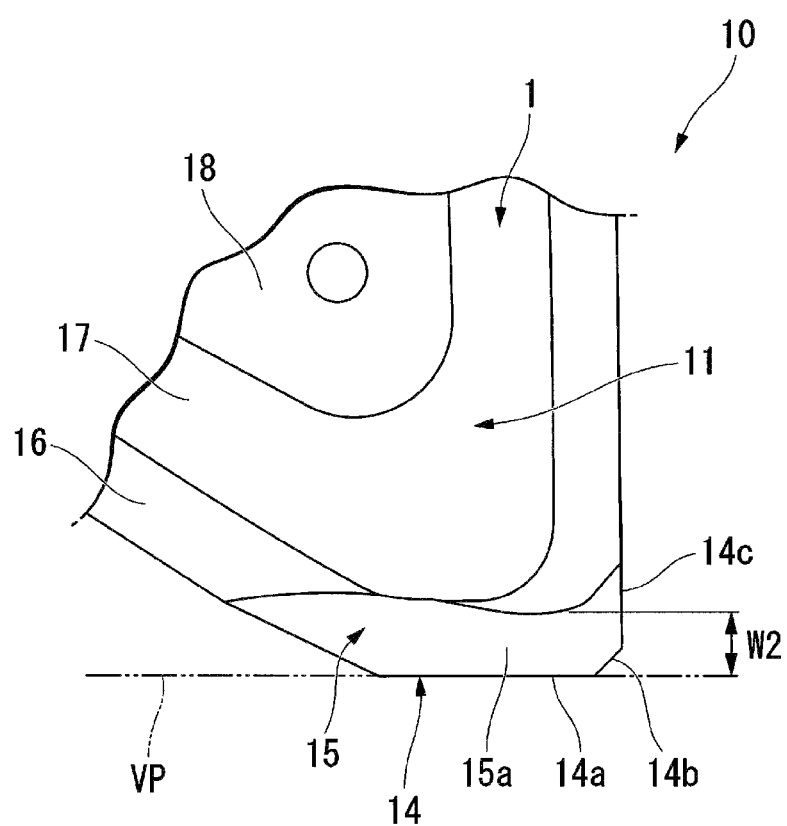
FIG. 4 is an enlarged view illustrating a part IV of FIG. 1.
Figure 5:
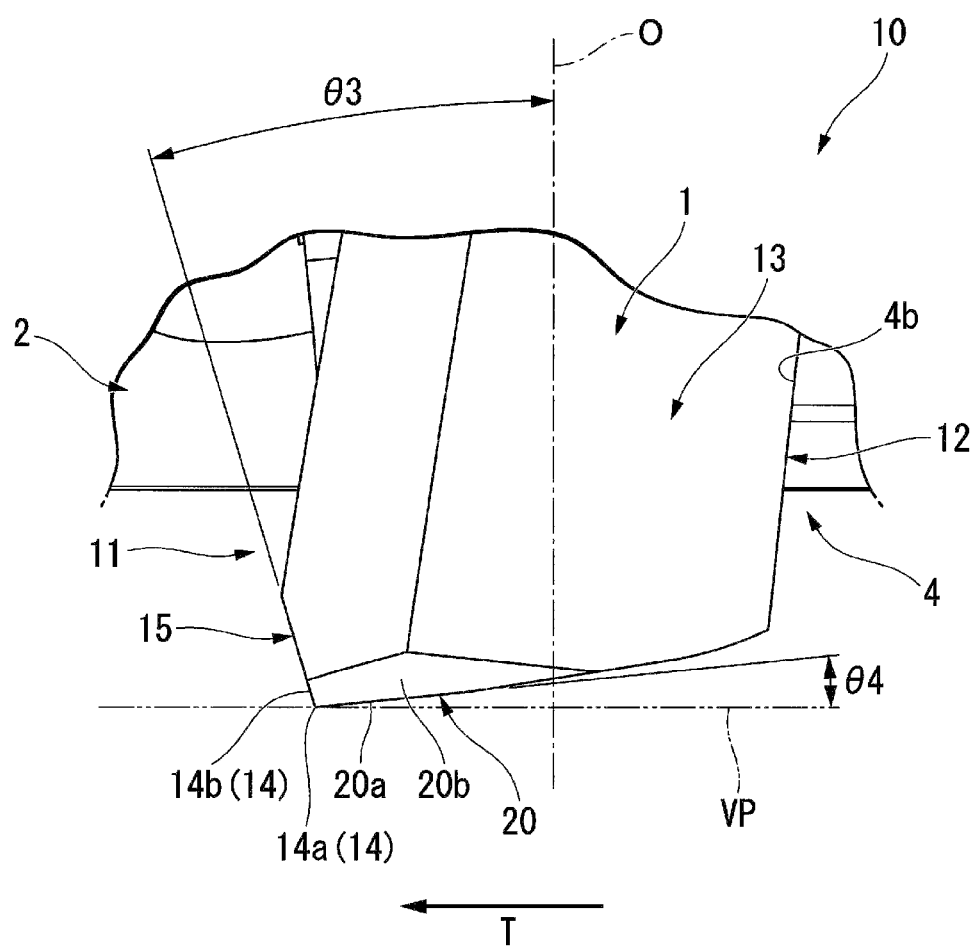
FIG. 5 is an enlarged view illustrating a part V of FIG. 2.
Figure 6:
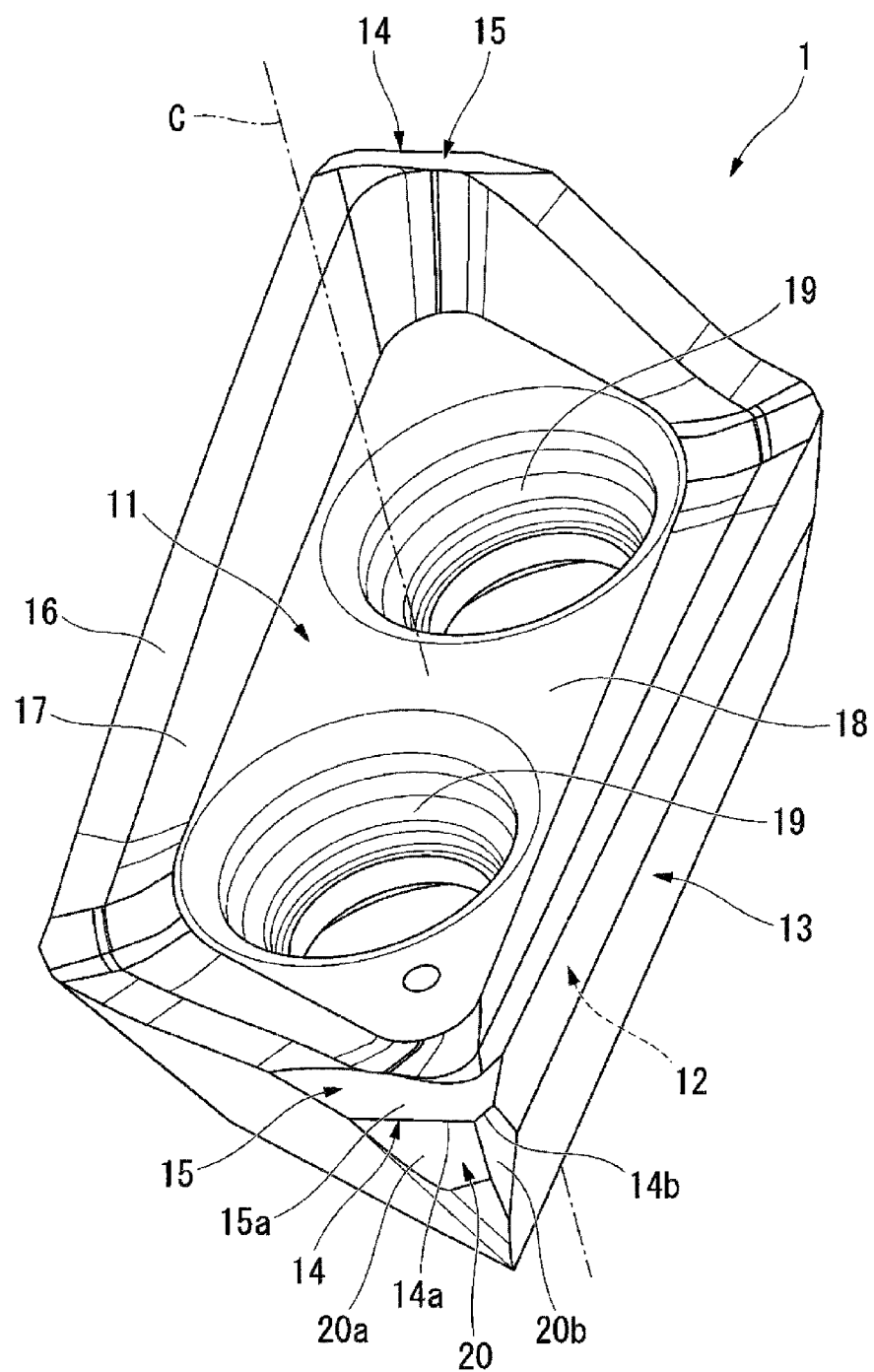
FIG. 6 is a perspective view illustrating the cutting insert according to the embodiment of the disclosure.
Figure 7:
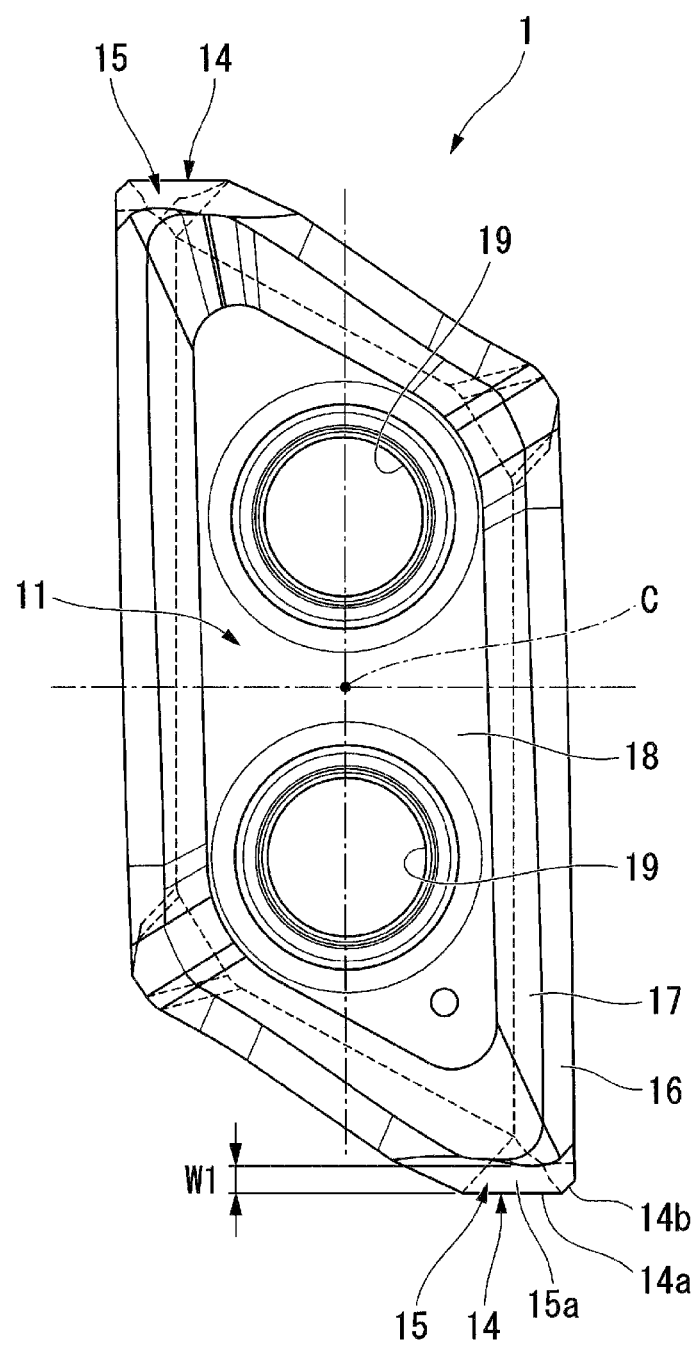
FIG. 7 is a plan view (front view) illustrating the cutting insert as viewed from an insert axial direction.

As illustrated in FIGS. 4 to 6, the corner cutting edge portion 14b has a linear shape or a convex curved shape. In the present embodiment, the corner cutting edge portion 14b has a linear shape. The corner cutting edge portion 14b is coupled to an end of the main cutting edge portion 14a in the cutting edge length direction. The corner cutting edge portion 14b extends in a direction different from the cutting edge length direction of the main cutting edge portion 14a. An edge length of the corner cutting edge portion 14b is shorter than an edge length of the main cutting edge portion 14a.

As illustrated in FIGS. 4 and 5, when the cutting insert 1 is attached to the tool holder 2, the corner cutting edge portion 14b is coupled to the outward end of the main cutting edge portion 14a in the holder radial direction among two ends of the main cutting edge portion 14a in the cutting edge length direction. The corner cutting edge portion 14b extends rearward in the holder axial direction as the corner cutting edge portion 14b extends outward in the holder radial direction from the outward end. The corner cutting edge portion 14b extends toward the holder rotation direction T as the corner cutting edge portion 14b extends rearward in the holder axial direction from the outward end of the main cutting edge portion 14a.

Front Surface

When the cutting insert 1 is attached to the tool holder 2, the front surface 11 faces the holder rotation direction T. As illustrated in FIGS. 6 to 9, the front surface 11 has a polygonal shape. The front surface 11 may have a shape other than the polygonal shape. In the present embodiment, the front surface 11 has a substantially quadrangular shape, for example, a substantially parallel quadrilateral shape or a substantially rectangular shape. The four sides forming the outer peripheral edge of the front surface 11 include the pair of long sides and the pair of short sides.

The front surface 11 includes a rake surface 15, a first inclined surface 16, a second inclined surface 17, and a flat surface 18.

The rake surface 15 constitutes at least a part of a peripheral edge of the front surface 11. The rake surface 15 is adjacent to the cutting edge 14 and disposed on the inward side of the cutting edge 14 in the insert radial direction. The rake surface 15 is coupled to the cutting edge 14. In the present embodiment, multiple rake surfaces 15 are provided on the front surface 11 (in one example, on the peripheral edge of the front surface 11). The multiple rake surfaces 15 are disposed at intervals in the insert circumferential direction. In the present embodiment, when viewed from the insert axial direction, the rake surface 15 extends along a part of the short side of the outer peripheral edge of the front surface 11.

Figure 8:
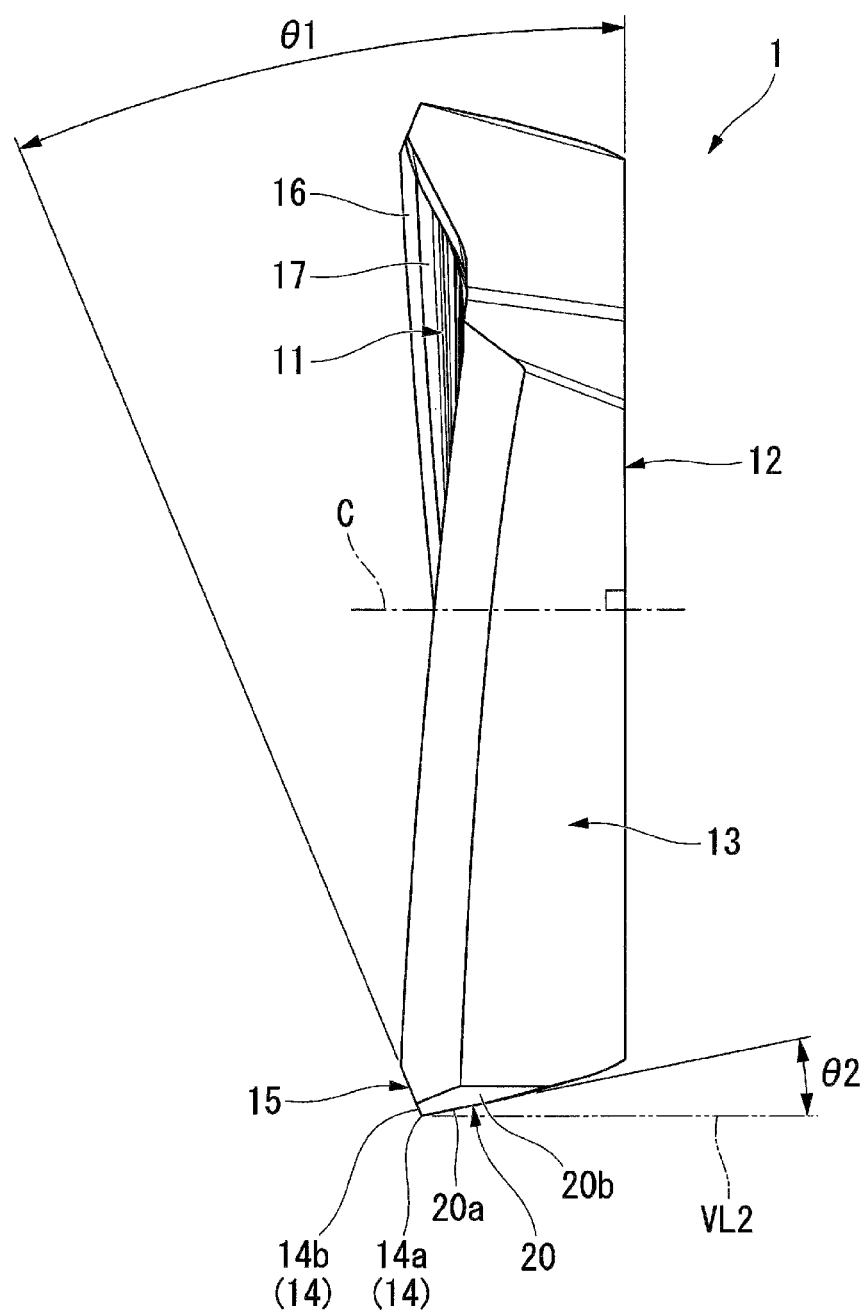
FIG. 8 is a side view illustrating the cutting insert as viewed from the cutting edge length direction of the main cutting edge portion.

As illustrated in FIG. 8, the rake surface 15 extends while being inclined from the back surface 12 side to the front surface 11 side in the insert axial direction as the rake surface 15 extends inward in the insert radial direction from the cutting edge 14. As illustrated in FIG. 8, when viewed from the cutting edge length direction of the main cutting edge portion 14a, the first angle θ1 between the back surface 12 and the rake surface 15 is larger than 0°. The first angle θ1 is preferably 4° or more, and more preferably 5° or more. The first angle θ1 is 40° or less. The first angle θ1 is preferably 17° or less.

In FIG. 7, the rake surface 15 includes a rake portion 15a. The rake portion 15a forms a part of the rake surface 15, and is located between both ends of the main cutting edge portion 14a in the cutting edge length direction of the main cutting edge portion 14a. As illustrated in FIG. 7, when viewed from the insert axial direction, a first width W1 of the rake portion 15a in a direction orthogonal to the main cutting edge portion 14a is 0.3 mm or more.

As illustrated in FIG. 5, when the cutting insert 1 is attached to the tool holder 2, the rake surface 15 extends while being inclined in the holder rotation direction T as the rake surface 15 extends rearward in the holder axial direction from the cutting edge 14. That is, the rake surface 15 is a negative inclined surface having a negative axial rake angle. As illustrated in FIG. 5, when viewed from the cutting edge length direction of the main cutting edge portion 14a, a third angle θ3 between the holder center axis O and the rake surface 15 is larger than 0° and is 30° or less. The third angle θ3 may be referred to as an "axial rake angle of the main cutting edge portion 14a". The axial rake angle of the main cutting edge portion 14a is smaller than 0° (that is, a negative angle) and is −30° or more.

In FIG. 4, a reference sign VP indicates a virtual plane perpendicular to the holder center axis O. As illustrated in FIG. 4, when the front surface 11 is viewed in the front from the holder circumferential direction, a second width W2 of the rake portion 15a of the rake surface 15a in the holder axial direction is 0.3 mm or more.

As illustrated in FIGS. 6 to 9, the first inclined surface 16 constitutes at least a part of the peripheral edge of the front surface 11. The first inclined surface 16 extends along a part of the short side and the long side of the outer peripheral edge of the front surface 11 when viewed from the insert axial direction. The first inclined surface 16 extends while being inclined from the front surface 11 side to the back surface 12 side in the insert axial direction as the first inclined surface 16 extends inward in the insert radial direction from the outer peripheral edge of the front surface 11. The first inclined surface 16 may include a rake surface coupled to the cutting edge. The rake surface in this case is a second rake surface different from the above-mentioned rake surface 15 (which may be referred to as a "first rake surface 15"). The second rake surface is a positive inclined surface.

The second inclined surface 17 is located on the inward side of the first inclined surface 16 on the front surface 11. The second inclined surface 17 is coupled to the first inclined surface 16 from the inward side in the insert radial direction. The second inclined surface 17 extends along the first inclined surface 16. The second inclined surface 17 extends while being inclined from the front surface 11 side to the back surface 12 side in the insert axial direction as the second inclined surface 17 extends inward in the insert radial direction from a coupling portion between the first inclined surface 16 and the second inclined surface 17.

As illustrated in FIG. 9, an inclined angle of the second inclined surface 17 with respect to the back surface 12 is larger than an inclined angle of the first inclined surface 16 with respect to the back surface 12.

As illustrated in FIGS. 6 and 7, the flat surface 18 is located on the inward side of the second inclined surface 17 on the front surface 11. The flat surface 18 has a flat shape perpendicular to the insert center axis C. The flat surface 18 is parallel to the back surface 12. The flat surface 18 has a polygonal shape. In the present embodiment, the flat surface 18 has a substantially quadrangular shape, for example, a substantially parallel quadrilateral shape or a substantially rectangular shape.

Back Surface

The back surface 12 has a flat shape perpendicular to the insert center axis C. The back surface 12 has a polygonal shape. In the present embodiment, the back surface 12 has a substantially quadrangular shape, for example, a substantially parallel quadrilateral shape or a substantially rectangular shape. As illustrated in FIGS. 2 and 3, when the cutting insert 1 is mounted on the tool holder 2, the back surface 12 faces the direction reversed to the holder rotation direction T. The back surface 12 is in contact with the mounting surface 4b of the insert mounting seat 4.

Outer Peripheral Surface

As illustrated in FIGS. 6 to 9, the outer peripheral surface 13 faces outward in the insert radial direction. The outer peripheral surface 13 extends while being inclined inward in the insert radial direction as the outer peripheral surface 13 extends from the front surface 11 side to the back surface 12 side in the insert axial direction. That is, the outer peripheral surface 13 is a positive inclined surface.

The outer peripheral surface 13 includes a flank surface 20.

The flank surface 20 constitutes at least apart of the outer peripheral surface 13. The flank surface 20 is adjacent to the cutting edge 14. The flank surface 20 is coupled to the cutting edge 14. The flank surface 20 extends while being inclined inward in the insert radial direction as the flank surface 20 extends from the front surface 11 side to the back surface 12 side in the insert axial direction. As illustrated in FIG. 8, an inclined angle of a part of the outer peripheral surface 13 that is closer to the back surface 12 in the insert axial direction than the flank surface 20 with respect to the insert center axis C is larger than an inclined angle between the insert center axis C and the flank surface 20 (that is, a second angle θ2 which will be described later). In the present embodiment, multiple flank surfaces 20 are provided on the outer peripheral surface 13. The multiple flank surfaces 20 are disposed at intervals in the insert circumferential direction.

The number of flank surfaces 20 provided on the cutting insert 1 is the same as the number of rake surfaces 15 provided on the cutting insert 1. In the present embodiment, the number of flank surfaces 20 is two.

The flank surface 20 includes a first flank surface 20a and a second flank surface 20b.

The first flank surface 20a is adjacent to the main cutting edge portion 14a. The first flank surface 20a is coupled to the main cutting edge portion 14a. The first flank surface 20a has a flat shape. The first flank surface 20a extends while being inclined inward in the insert radial direction as the first flank surface 20a extends from the front surface 11 side to the back surface 12 side in the insert axial direction.

The second flank surface 20b is adjacent to the corner cutting edge portion 14b. The second flank surface 20b is coupled to the corner cutting edge portion 14b. The second flank surface 20b has a flat shape or a convex curved surface shape. In the present embodiment, the corner cutting edge portion 14b has a linear shape, and the second flank surface 20b has a flat shape. When the corner cutting edge portion 14b has a convex curved shape, the second flank surface 20b has a convex curved surface shape. The second flank surface 20b extends while being inclined inward in the insert radial direction as the second flank surface 20b extends from the front surface 11 side to the back surface 12 side in the insert axial direction.

As illustrated in FIG. 8, when viewed from the cutting edge length direction of the main cutting edge portion 14a, the second angle θ2 between the flank surface 20 (in one example, the first flank surface 20a) and a virtual straight line VL2 passing through the main cutting edge portion 14a and parallel to the insert center axis C may be referred to as the second angle θ2 between the flank surface 20 and the insert center axis C. The second angle θ2 is larger than 0°. The second angle θ2 is preferably 2.5° or more, and more preferably 3.5° or more.

As illustrated in FIG. 5, when viewed from the cutting edge length direction of the main cutting edge portion 14a, in a state in which the cutting insert 1 is mounted on the tool holder 2, a fourth angle θ4 between the flank surface 20 (in one example, the first flank surface 20a) and the virtual plane VP perpendicular to the holder center axis O is 3° or more. The fourth angle θ4 is 20° or less. The fourth angle θ4 is preferably 6° or less.

Through Hole

As illustrated in FIGS. 6 and 7, the through hole 19 passes through the cutting insert 1 in the insert axial direction. The through hole 19 extends inside the cutting insert 1 in the insert axial direction and opens to the front surface 11 and the back surface 12. A cross section of the through hole 19 taken along a plane perpendicular to the insert center axis C has a circular shape. Multiple through holes 19 are provided in the cutting insert 1. When viewed from the insert axial direction as illustrated in FIG. 7, the multiple through holes 19 are arranged along the long side among the four sides (the pair of long sides and the pair of short sides) constituting the outer peripheral edge of the front surface 11.

Screw Member

As illustrated in FIG. 1, the screw member 3 detachably fixes the cutting insert 1 to the insert mounting seat 4 of the tool holder 2. The screw member 3 is inserted into the through hole 19 of the cutting insert 1 and screwed into the screw hole 4d of the insert mounting seat 4.

The screw member 3 includes a screw shaft (not illustrated) and a screw head 3a.

The screw shaft is inserted into the through hole 19 and the screw hole 4d. The screw shaft includes a male screw. The male screw of the screw shaft is screwed into the female screw of the screw hole 4d.

The screw head 3a is coupled to an end of the screw shaft. An outer diameter of the screw head 3a is larger than an outer diameter of the screw shaft. At least a part of the screw head 3a is inserted into the through hole 19. The screw head 3a comes into contact with a tapered opening of the through hole 19.

Rotary Cutting Method

Next, a rotary cutting method for performing the rotary cutting on the workpiece using the cutting edge-replaceable rotary cutting tool 10 will be described.

Figure 10:
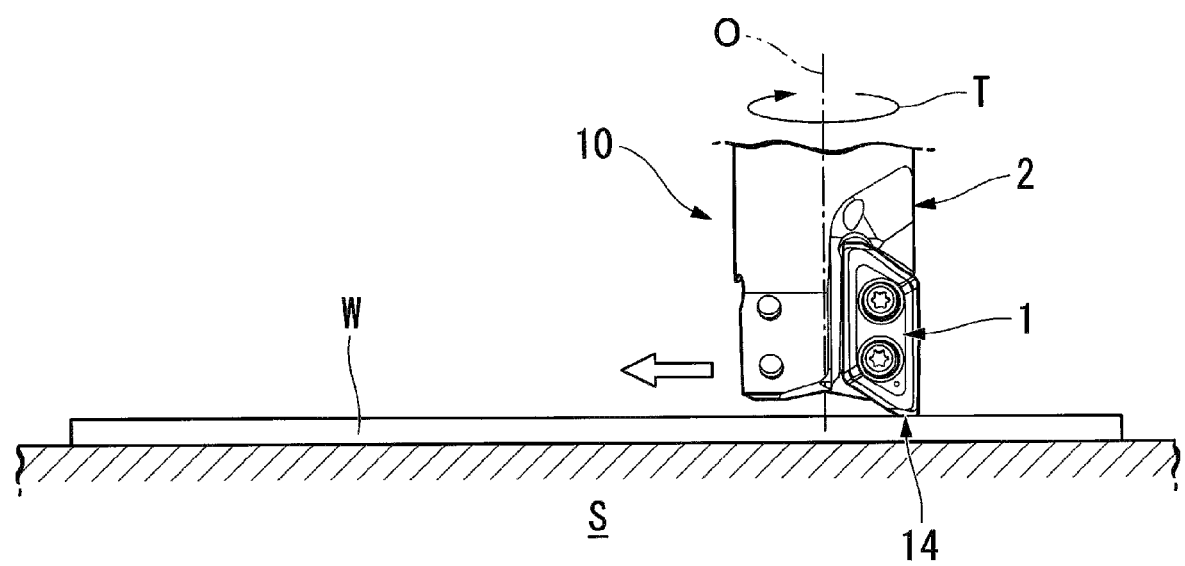
FIG. 10 is a diagram illustrating a rotary cutting method for performing rotary cutting on a workpiece using the cutting edge-replaceable rotary cutting tool.

As illustrated in FIG. 10, a workpiece W is made of, for example, an aluminum alloy, is a long member of several meters (for example, 3 meters or more), and has the plate-shaped part having the plate thickness of several millimeters (for example, about 2 mm). The workpiece W is fixed to a base S of a machine tool. Among the pair of plate surfaces of the plate-shaped part of the workpiece W, one plate surface (for example, a lower surface) is in contact with a support surface of the base S of the machine tool, and the other plate surface (for example, an upper surface) is subjected to the rotary cutting by the cutting edge-replaceable rotary cutting tool 10. The rotary cutting method of the present embodiment is a method of performing the rotary cutting on at least a plate surface (f) of the plate-shaped part of the workpiece W, and is particularly suitable for finishing. The rotary cutting method of the present embodiment is suitable for performing the rotary cutting on a pocket portion (not illustrated) of the workpiece.

As illustrated in FIG. 10, the rotary cutting method of the present embodiment includes causing the front end of the tool holder 2 to face the workpiece W from the holder axial direction, rotating the tool holder 2 in the holder rotation direction T, and performing the rotary cutting on the workpiece W with the cutting edge 14.

Figure 11:
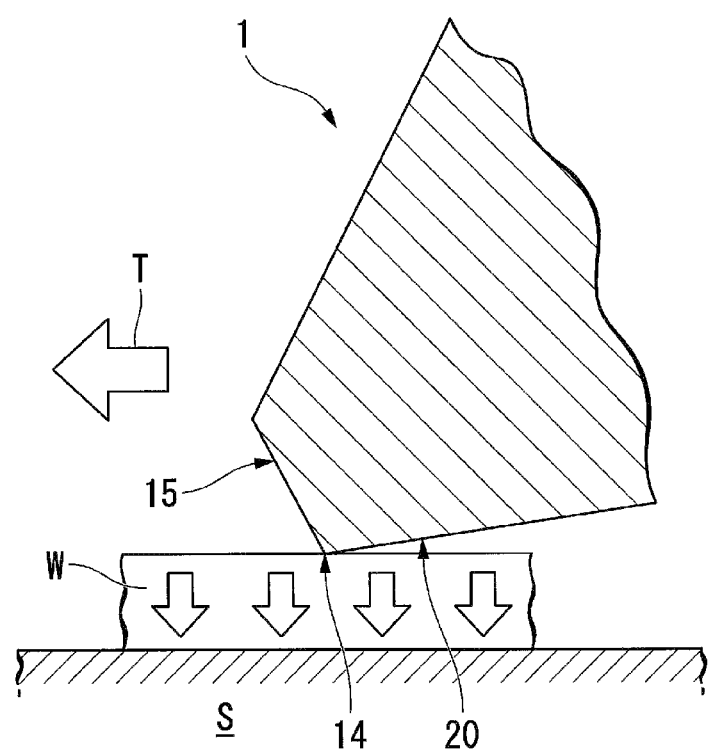
FIG. 11 is an enlarged view illustrating a vicinity of the cutting edge and the rotary cutting method according to the embodiment of the disclosure.

At this time, as illustrated in FIG. 11, the workpiece W is subjected to the rotary cutting while a component force that is directed forward in the holder axial direction (in one example, a component force in a direction opposite to aback component force) is applied to the workpiece W. That is, the workpiece W is subjected to the rotary cutting while a compressive residual stress that is directed forward in the holder axial direction is applied to the workpiece W.

Operational Effects According to Present Embodiment

Firstly, the operational effects of the cutting insert 1 will be described.

In the cutting insert 1 of the present embodiment, the outer peripheral surface 13 on which the flank surface 20 is provided is the positive inclined surface that is inclined inward in the insert radial direction as the positive inclined surface extends from the front surface 11 side to the back surface 12 side in the insert axial direction. The rake surface 15 is the negative inclined surface that extends from the back surface 12 side to the front surface 11 side in the insert axial direction as the negative inclined surface extends inward in the insert radial direction from the cutting edge 14.

Figure 12:
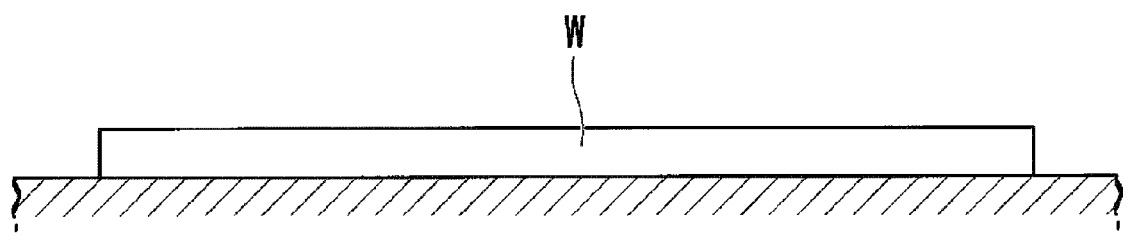
FIG. 12 is a diagram illustrating a warpage amount of the workpiece that is subjected to rotary cutting in the rotary cutting method according to the embodiment of the disclosure.

With the cutting insert 1 of the present embodiment, as illustrated in FIG. 11, the rotary cutting can be performed while the component force in a compression direction (in one example, the component force in the direction opposite to the back component force) is applied to the workpiece W, so as to press the workpiece W against the base S of the machine tool on which the workpiece W is supported. That is, the rotary cutting can be performed while pressing the workpiece W sandwiched between the cutting insert 1 and the base S. As a result, as illustrated in FIG. 12, the workpiece W can be prevented from bending after the rotary cutting, and the workpiece W can be prevented from warping.

In more detail, in general, the workpiece W has a different distribution of the residual stress (that is, a tensile residual stress and a compressive residual stress) in each part in a plate thickness direction as a characteristic of a material (a material before the rotary cutting), and the balance of the distribution of the residual stress changes after the workpiece W is subjected to the rotary cutting. Therefore, in related art, a moment of force is generated in the workpiece W due to the rotary cutting, and the workpiece W is warped. On the other hand, in the present embodiment, the rotary cutting is performed while applying the compressive residual stress to the workpiece W, so that the change in the balance of the distribution of the residual stress of the workpiece W can be prevented and the generation of the moment of the force can be prevented. Accordingly, the warpage of the workpiece W is prevented.

In particular, even in a case of performing the rotary cutting on a plate-shaped part, having a plate thickness of about several millimeters, of the workpiece W such as a long wing surface member of an aircraft that extends for several meters, the warpage of the workpiece W can be remarkably prevented, and processing quality is improved. After the rotary cutting, labor of performing various measures for correcting the warpage of the workpiece W is reduced, the manufacturing cost is reduced, and the productivity is improved.

In order to make it easier to understand the operational effects of the present embodiment, a reference example different from the present embodiment will be described with reference to FIGS. 13 and 14.

Figure 13:
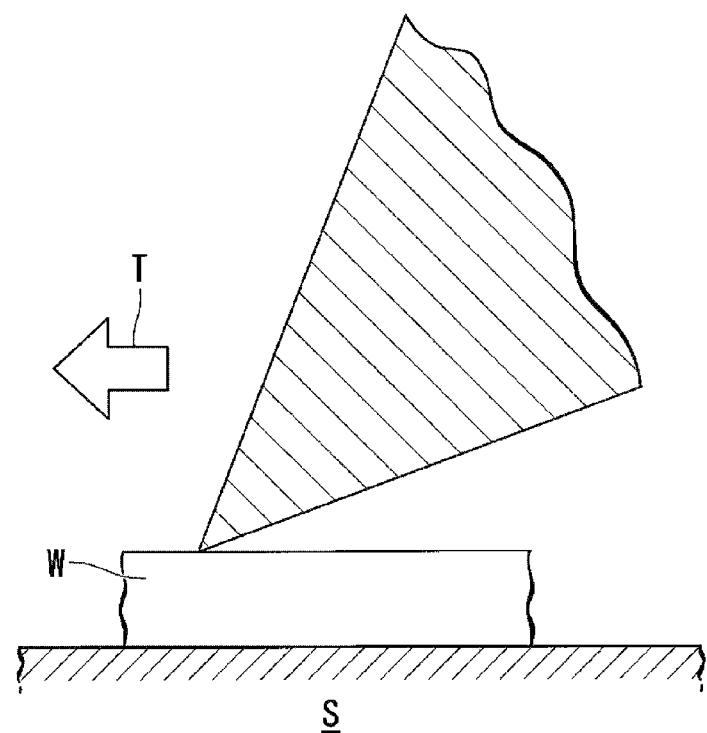
FIG. 13 is an enlarged view illustrating the vicinity of the cutting edge and a rotary cutting method according to a reference example.
Figure 14:
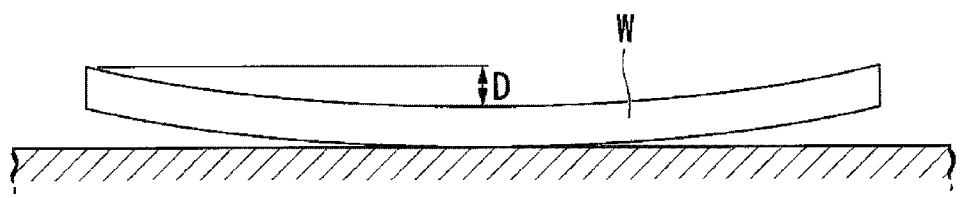
FIG. 14 is a diagram illustrating a warpage amount of the workpiece that is subjected to rotary cutting in the rotary cutting method according to the reference example.

FIG. 13 is an enlarged view illustrating a vicinity of the cutting edge of the cutting insert mounted on the cutting edge-replaceable rotary cutting tool of the reference example during the rotary cutting. This cutting insert is inclined in the direction reversed to the holder rotation direction T as the rake surface of the cutting edge faces rearward in the holder axial direction. That is, the rake angle of the cutting edge is a positive angle.

When the rotary cutting is performed on the workpiece W with this cutting insert, the workpiece W is not pressed against the base S of the machine tool, that is, the rotary cutting is not performed while the compressive residual stress is applied to the work material W, and the balance of the distribution of the residual stress of the workpiece W is likely to change. Therefore, a moment of the force is generated in the workpiece W, the workpiece W after the rotary cutting bends, and the workpiece W warps as illustrated in FIG. 14. This warpage amount D is, for example, about 1 mm. However, if the warpage remains, it would be difficult to assemble the workpiece W as the wing surface member of an aircraft, and various measures for correcting the warpage are to be taken.

According to the present embodiment, the various measures for correcting the warpage can be reduced.

In the cutting insert 1 of the present embodiment, when viewed from the cutting edge length direction of the main cutting edge portion 14a, the first angle θ1 at which the rake surface 15 is inclined with respect to the back surface 12 perpendicular to the insert center axis C is 4° or more. Therefore, regardless of a mounting angle of the cutting insert 1 to the tool holder 2, the rake angle of the main cutting edge portion 14a is stably set to a negative angle, it becomes easier to apply a component force in the compression direction to the workpiece W, and the function of preventing the warpage of the workpiece W becomes more stable. More preferably, the first angle θ1 is 5° or more.

When viewed from the cutting edge length direction of the main cutting edge portion 14a, the second angle θ2 at which the flank surface 20 is inclined with respect to the insert center axis C is 2.5° or more. Therefore, regardless of the mounting angle of the cutting insert 1 to the tool holder 2, it is easy to stably secure a flank angle of the main cutting edge portion 14a. More preferably, the second angle θ2 is 3.5° or more.

The cutting insert 1 of the present embodiment has the first angle θ1 of 40° or less.

When the first angle θ1 at which the rake surface 15 is inclined with respect to the back surface 12 is 40° or less as viewed from the cutting edge length direction of the main cutting edge portion 14a, the above-mentioned operational effects can be obtained while good sharpness of the main cutting edge portion 14a is maintained. More preferably, the first angle θ1 is 17° or less.

Further, the cutting insert 1 of the present embodiment has the first width W1 of 0.3 mm or more.

When the first width W1 of the rake portion 15a of the rake surface 15 adjacent to the main cutting edge portion 14a is 0.3 mm or more as viewed from the insert axial direction, regardless of a depth of cut (depth) during the rotary cutting with the main cutting edge portion 14a, the rake portion 15a makes it easy to stably apply a component force in the compression direction to the workpiece. More preferably, the first width W1 is 0.7 mm or more.

In the cutting insert 1 of the present embodiment, the cutting edge 14 includes the main cutting edge portion 14a and the corner cutting edge portion 14b.

In this case, the workpiece is cut by the corner cutting edge portion 14b first during the rotary cutting, so that damage and the like of the main cutting edge portion 14a is prevented, and cutting accuracy by the main cutting edge portion 14a is stably ensured.

Next, operational effects of the cutting edge-replaceable rotary cutting tool 10 will be described.

In the cutting edge-replaceable rotary cutting tool 10 of the present embodiment, the rake surface 15 of the cutting insert 1 is the negative inclined surface that is inclined in the holder rotation direction T as the negative inclined surface extends rearward in the holder axial direction. That is, the axial rake angle of the cutting edge 14 is a negative angle.

With the cutting edge-replaceable rotary cutting tool 10 of the present embodiment, as illustrated in FIG. 11, the rotary cutting can be performed while the component force in the compression direction (in one example, the component force in the direction opposite to the back component force) is applied to the workpiece W, so as to press the workpiece W against the base S of the machine tool on which the workpiece W is supported. That is, the rotary cutting can be performed while pressing the workpiece W sandwiched between the cutting edge-replaceable rotary cutting tool 10 and the base S. As a result, as illustrated in FIG. 12, the workpiece W can be prevented from bending after the rotary cutting, and the workpiece W can be prevented from warping. That is, in the present embodiment, the rotary cutting is performed while applying the compressive residual stress to the workpiece W, so that the change in the balance of the distribution of the residual stress of the workpiece W can be prevented and the generation of the moment of the force can be prevented. Accordingly, the warpage of the workpiece W is prevented. In particular, even in a case of performing the rotary cutting on a plate-shaped part, having a plate thickness of about several millimeters, of the workpiece W such as a long wing surface member of an aircraft that extends for several meters, the warpage of the workpiece W can be remarkably prevented, and processing quality is improved. After the rotary cutting, labor of performing various measures for correcting the warpage of the workpiece W is reduced, the manufacturing cost is reduced, and the productivity is improved.

The mounting surface 4b of the insert mounting seat 4 is the positive inclined surface that is inclined in the direction reversed to the holder rotation direction T as the positive inclined surface extends rearward in the holder axial direction. Therefore, the axial rake angle of the part of the front surface 11 of the cutting insert 1 other than the rake surface 15 can be set to a positive angle, and chip evacuation property can be improved. It also becomes easier to provide the chip pocket 5 having a large volume, and chip processing becomes more stable.

The mounting surface 4b is the inclined surface having the positive angle, so that the mounting surface 4b can prevent the workpiece W from being pressed too much via the cutting insert 1. Therefore, the accuracy of the surface to be processed of the workpiece W is maintained well.

Further, the cutting edge-replaceable rotary cutting tool 10 of the present embodiment has the third angle θ3 of 30° or less.

The configuration in which the third angle θ3 at which the rake surface 15 of the negative inclined surface is inclined with respect to the holder center axis O is 30° or less when viewed from the cutting edge length direction of the main cutting edge portion 14*a* is the same as the configuration in which the axial rake angle of the main cutting edge portion 14*a* is a negative angle and is −30° or more. In this case, the above-mentioned operational effects can be obtained while the good sharpness of the main cutting edge portion 14*a* is maintained.

In the cutting edge-replaceable rotary cutting tool 10 of the present embodiment, when viewed from the holder axial direction, the main cutting edge portion 14*a* is inclined in the direction reversed to the holder rotation direction T as the main cutting edge portion 14*a* extends outward in the holder radial direction. That is, the radial rake angle of the main cutting edge portion 14*a* is the negative angle. Therefore, it is easy to stably apply the component force in the compression direction to the workpiece W.

The configuration in which the fifth angle θ5 at which the main cutting edge portion 14*a* is inclined with respect to the virtual straight line VL1 passing through the holder center axis O and the outward end of the main cutting edge portion 14*a* in the holder radial direction is 12° or more when viewed from the holder axial direction as illustrated in FIG. 3 is the same as the configuration in which the radial rake angle of the main cutting edge portion 14*a* has a negative angle that is −12° or less. In this case, the rotary cutting can be performed more stably while the component force in the compression direction is applied to the workpiece W.

The configuration in which the fifth angle θ5 is 30° or less when viewed from the holder axial direction is the same as the configuration in which the radial rake angle of the main cutting edge portion 14*a* is a negative angle and is −30° or more. In this case, the above-mentioned operational effects can be obtained while the good sharpness of the main cutting edge portion 14*a*, good rigidity of the cutting insert 1, and ease of manufacture are maintained.

The cutting edge-replaceable rotary cutting tool 10 of the present embodiment has the fourth angle θ4 of 3° or more.

When the fourth angle θ4 (that is, the flank angle) at which the flank surface 20 is inclined with respect to the virtual plane VP is 3° or more as viewed from the cutting edge length direction of the main cutting edge portion 14*a*, the rotary cutting can be stably performed with the main cutting edge portion 14*a* while cutting resistance and flank wear are reduced.

The cutting edge-replaceable rotary cutting tool 10 of the present embodiment has the fourth angle θ4 of 20° or less.

When the fourth angle θ4 at which the flank surface 20 is inclined with respect to the virtual plane VP is 20° or less as viewed from the cutting edge length direction of the main cutting edge portion 14*a*, a part of the flank surface 20 acts to press the surface to be processed of the workpiece W during the rotary cutting, and it is easy to more stably apply a component force in the compression direction to the workpiece W. More preferably, the fourth angle θ4 is 6° or less.

The cutting edge-replaceable rotary cutting tool 10 of the present embodiment has the second width W2 of 0.3 mm or more.

When the second width W2 of the rake portion 15*a* of the rake surface 15 adjacent to the main cutting edge portion 14*a* is 0.3 mm or more as viewed from the holder circumferential direction, regardless of the depth of cut (depth) in the holder axial direction during the rotary cutting with the main cutting edge portion 14*a*, it is easy to more stably apply a component force in the compression direction to the workpiece W. More preferably, the second width W2 is 0.7 mm or more.

In the cutting edge-replaceable rotary cutting tool 10 of the present embodiment, the cutting edge 14 includes the main cutting edge portion 14*a* and the corner cutting edge portion 14*b*.

In this case, the workpiece W is cut by the corner cutting edge portion 14*b* first during the rotary cutting with a tool feed in the holder radial direction, so that damage and the like of the main cutting edge portion 14*a* is prevented, and cutting accuracy by the main cutting edge portion 14*a* is stably ensured.

Next, operational effects of the rotary cutting method using the cutting edge-replaceable rotary cutting tool 10 will be described.

According to the rotary cutting method of the present embodiment, as illustrated in FIG. 11, the rotary cutting can be performed while the component force in the compression direction (in one example, the component force in the direction opposite to the back component force) is applied to the workpiece W such that the workpiece W is pressed against the base S of the machine tool on which the workpiece W is supported. That is, the rotary cutting can be performed while pressing the workpiece W sandwiched between the cutting edge-replaceable rotary cutting tool 10 and the base S. As a result, as illustrated in FIG. 12, the workpiece W can be prevented from bending after the rotary cutting, and the workpiece W can be prevented from warping. That is, in the present embodiment, the rotary cutting is performed while applying the compressive residual stress to the workpiece W, so that the change in the balance of the distribution of the residual stress of the workpiece W can be prevented and the generation of the moment of the force can be prevented. Accordingly, the warpage of the workpiece W is prevented. In particular, even in a case of performing the rotary cutting on a plate-shaped part, having a plate thickness of about several millimeters, of the workpiece W such as a long wing surface member of an aircraft that extends for several meters, the warpage of the workpiece W can be remarkably prevented, and processing quality is improved. After the rotary cutting, labor of performing various measures for correcting the warpage of the workpiece W is reduced, the manufacturing cost is reduced, and the productivity is improved.

Other Configurations

The disclosure is not limited to the above-described embodiment, and the configuration may be changed without departing from the spirit of the disclosure, for example, as described below.

In the above-described embodiment, the cutting insert 1 has a quadrangular plate shape, but the cutting insert 1 is not limited to this. The cutting insert 1 may have a triangular plate shape or the like, for example. The cutting insert 1 may also be a so-called round piece insert having a disk shape. In this case, the main cutting edge portion of the cutting edge has a circular shape centered on the insert center axis C. In this case, "when viewed from the cutting edge length direction of the main cutting edge" means "when viewed from a direction (that is, tangential direction) in which a tangent line of the main cutting edge that passes through a part of the main cutting edge portion (a front end in the holder axial direction) extends".

In the above-described embodiment, the main cutting edge portion 14a has the linear shape, but the main cutting edge portion 14a is not limited to this. The main cutting edge portion 14a may have, for example, a convex curved shape having a large radius of curvature. In this case, "when viewed from the cutting edge length direction of the main cutting edge portion" also means "when viewed from the direction (that is, the tangential direction) in which the tangent line of the main cutting edge portion that passes through a part of the main cutting edge portion extends".

As illustrated in FIG. 4, the cutting edge 14 may include, for example, a side cutting edge portion 14c as a cutting edge other than the main cutting edge portion 14a and the corner cutting edge portion 14b. The side cutting edge portion 14c extends in a direction substantially orthogonal to the main cutting edge portion 14a, and is coupled to the other end, which is different from one end coupled to the main cutting edge portion 14a, of two ends of the corner cutting edge portion 14b.

Configurations (or elements) described in the above-described embodiments, modifications, and notes may be combined as long as it does not deviate from the spirit of the disclosure. Also, a configuration may be added, omitted, replaced, and other changes may be made. The disclosure is not limited by the above-described embodiments, and is limited only by the appended claims.

With the cutting insert, the cutting edge-replaceable rotary cutting tool, and the rotary cutting method of the disclosure, generation of the warpage on the workpiece can be prevented.

The invention claimed is:

1. A cutting insert having a plate shape centered on an insert center axis, the cutting insert comprising:
    a front surface and a back surface facing each other in an insert axial direction that is a direction in which the insert center axis extends;
    an outer peripheral surface extending from the front surface to the back surface; and
    a cutting edge formed at an intersecting ridge line between the front surface and the outer peripheral surface,
    wherein the outer peripheral surface comprises a flank surface extends from the cutting edge toward the back surface,
    wherein the flank surface inclines toward the insert center axis as the flank surface extends from the cutting edge toward the back surface,
    wherein the front surface comprises a flat surface and a peripheral area surrounding the flat surface,
    wherein the peripheral area comprises an inclined surface and a rake surface,
    wherein the inclined surface has a first edge coupled to the flat surface and a second edge opposite the first edge, and is angled with respect to the flat surface so that the second edge is located away from the insert center axis and the back surface,
    wherein the second edge of the inclined surface has a first portion that is coupled to the outer peripheral surface and a second portion coupled to the rake surface,
    wherein the rake surface extends from the second portion of the second edge to couple to the cutting edge, and is angled with respect to the inclined surface so that the rake surface extends away from the insert center axis and toward the back surface,
    wherein the cutting edge comprises a main cutting edge portion, and
    wherein, when viewed from a cutting edge length direction of the main cutting edge portion, a first angle between the back surface and the rake surface is 4° or more, and a second angle between the insert center axis and the flank surface is 2.5° or more.

2. The cutting insert according to claim 1, wherein the first angle is 40° or less.

3. The cutting insert according to claim 1, wherein
the rake surface comprises a rake portion located between the one end and the another end of the main cutting edge portion, and
when viewed from a plan view of the front surface, a first width of the rake portion extending from the main cutting edge portion toward the insert center axis is 0.3 mm or more.

4. The cutting insert according to claim 2, wherein
the rake surface comprises a rake portion located between the one end and the another end of the main cutting edge portion, and
when viewed from a plan view of the front surface, a first width of the rake portion extending from the main cutting edge portion toward the insert center axis is 0.3 mm or more.

5. The cutting insert according to claim 1, wherein
the cutting edge comprises a corner cutting edge portion coupled to an end of the main cutting edge portion in the cutting edge length direction, the corner cutting edge portion having a linear shape or convex curved shape extending in a direction different from the cutting edge length direction.

6. The cutting insert according to claim 2, wherein
the cutting edge comprises a corner cutting edge portion coupled to an end of the main cutting edge portion in the cutting edge length direction, the corner cutting edge portion having a linear shape or convex curved shape extending in a direction different from the cutting edge length direction.

* * * * *